US009789549B2

(12) United States Patent
Nguyen et al.

(10) Patent No.: US 9,789,549 B2
(45) Date of Patent: Oct. 17, 2017

(54) ROBOTIC SYSTEM AND DRILLING END EFFECTOR FOR ROBOTIC SYSTEM

(71) Applicant: The Boeing Company, Chicago, IL (US)

(72) Inventors: Tuong Q. Nguyen, Bellevue, WA (US); John W. Pringle, IV, Gardena, CA (US)

(73) Assignee: The Boeing Company, Chicago, IL (US)

( * ) Notice: Subject to any disclaimer, the term of this patent is extended or adjusted under 35 U.S.C. 154(b) by 175 days.

(21) Appl. No.: 14/793,148

(22) Filed: Jul. 7, 2015

(65) Prior Publication Data

US 2017/0008094 A1    Jan. 12, 2017

(51) Int. Cl.
| | | |
|---|---|---|
| *B23B 47/34* | (2006.01) | |
| *B23B 39/14* | (2006.01) | |
| *B25J 11/00* | (2006.01) | |

(52) U.S. Cl.
CPC .............. *B23B 47/34* (2013.01); *B23B 39/14* (2013.01); *B25J 11/005* (2013.01); *B23B 2251/68* (2013.01); *B23B 2270/30* (2013.01); *B23B 2270/62* (2013.01); *Y10T 408/50* (2015.01)

(58) Field of Classification Search
CPC ..... B23B 39/14; B23B 47/34; B23B 2251/68; B23B 2270/30; B23B 2270/62; Y10T 408/50
See application file for complete search history.

(56) References Cited

U.S. PATENT DOCUMENTS

| | | | | |
|---|---|---|---|---|
| 3,638,737 A | * | 2/1972 | Moates .............. | B23Q 11/0046 173/60 |
| 4,209,069 A | * | 6/1980 | Smith ................ | B23Q 11/0046 173/75 |
| 4,518,307 A | | 5/1985 | Bloch | |
| 5,033,917 A | * | 7/1991 | McGlasson ............. | B23B 49/02 408/241 B |
| 5,213,454 A | | 5/1993 | Givler et al. | |
| 5,356,245 A | * | 10/1994 | Hosoi ..................... | B08B 15/04 408/56 |
| 5,395,187 A | * | 3/1995 | Slesinski ................. | B23B 49/02 408/1 R |
| 5,482,411 A | * | 1/1996 | McGlasson ............. | B23B 47/28 408/1 R |
| 5,584,618 A | * | 12/1996 | Blankenship ........... | B23B 31/22 408/1 R |
| 5,688,082 A | * | 11/1997 | Richardson ........ | B23Q 11/0046 408/113 |
| 5,848,859 A | * | 12/1998 | Clark ...................... | B23B 39/14 408/1 R |
| 5,947,661 A | * | 9/1999 | Sugata ................. | B23Q 1/0036 408/1 R |
| 6,079,078 A | * | 6/2000 | Byington ........... | B23Q 11/0046 144/252.1 |

(Continued)

FOREIGN PATENT DOCUMENTS

| | | | | |
|---|---|---|---|---|
| GB | 201419182 | * | 12/2014 | ............ B25J 9/0009 |
| JP | 61219509 A | * | 9/1986 | ......... B23Q 11/0053 |

*Primary Examiner* — Eric A Gates
(74) *Attorney, Agent, or Firm* — Walters & Wasylyna LLC

(57) ABSTRACT

A drilling end effector may include a motor operative to drive a drilling member, a housing surrounding the motor, and a vacuum shroud coupled to the housing and surrounding the drilling member, wherein the vacuum shroud has a variable length.

20 Claims, 10 Drawing Sheets

(56) References Cited

U.S. PATENT DOCUMENTS

| | | | | |
|---|---|---|---|---|
| 6,503,029 | B1* | 1/2003 | Ende | B23B 47/28 408/1 R |
| 6,514,018 | B2 | 2/2003 | Martinez et al. | |
| 7,168,894 | B2* | 1/2007 | Hansson | B23Q 11/0046 408/58 |
| 7,419,341 | B2* | 9/2008 | Granger | B23B 51/0413 173/198 |
| 7,740,086 | B2* | 6/2010 | Bleicher | B23Q 11/0046 173/198 |
| 7,901,164 | B2* | 3/2011 | Skradski | B23Q 11/0046 175/209 |
| 8,019,472 | B2* | 9/2011 | Montero SanJuan | B21J 15/14 180/8.1 |
| 8,337,124 | B2* | 12/2012 | Nguyen | B23B 49/02 408/1 R |
| 8,496,416 | B1* | 7/2013 | Fischer | B23B 39/14 408/126 |
| 8,676,426 | B1 | 3/2014 | Murphy | |
| 8,696,267 | B2* | 4/2014 | Khurana | B23B 49/006 279/76 |
| 8,751,147 | B2 | 6/2014 | Colwell | |
| 2009/0136309 | A1* | 5/2009 | Coulston | B23Q 11/0046 408/200 |
| 2011/0008117 | A1* | 1/2011 | Kasuya | B23Q 11/0046 408/67 |
| 2011/0008118 | A1* | 1/2011 | Yoshikane | B23Q 11/0046 408/67 |
| 2012/0063856 | A1* | 3/2012 | Miwa | B23Q 11/0046 408/67 |

* cited by examiner ial article if allowed to remain. In order to ensure that all the debris created by the drilling operation is removed, the debris removal process is often performed manually. As such, considerable time and labor must be devoted to the removal of any debris following the drilling operation.

ROBOTIC SYSTEM AND DRILLING END EFFECTOR FOR ROBOTIC SYSTEM

FIELD

The present disclosure is generally related to robotic systems and, more particularly, to a robotic system and a drilling end effector for a robotic system capable of capturing debris created during a drilling operation.

BACKGROUND

Many repetitive manufacturing operations are now automatically performed by robotic systems. For example, a programmable mechanical arm may manipulate various types of end of arm tooling to drill holes, install fasteners or perform other types of manufacturing operations. In areas where space is limited or access is restricted, those same manufacturing operations may need to be performed by hand. Certain manufacturing operations, whether performed manually (e.g., by hand) or automatically (e.g., by a robot) create debris. In certain manufacturing environments, such as in the aerospace industry, debris created from a drilling operation can potentially cause damage to the manufactured article if allowed to remain. In order to ensure that all the debris created by the drilling operation is removed, the debris removal process is often performed manually. As such, considerable time and labor must be devoted to the removal of any debris following the drilling operation.

Accordingly, those skilled in the art continue with research and development efforts in the field of robotic systems configured to perform drilling operations.

SUMMARY

In one embodiment, the disclosed drilling end effector may include a motor operative to drive a drilling member, a housing surrounding the motor, and a vacuum shroud coupled to the housing and surrounding the drilling member, wherein the vacuum shroud has a variable length.

In another embodiment, the disclosed robotic system may include a robotic arm, and a drilling end effector coupled to the robotic arm, wherein the drilling end effector includes a motor operative to drive a drilling member, a housing surrounding the motor, and a vacuum shroud coupled to the housing and surrounding the drilling member, wherein the vacuum shroud has a variable length.

In yet another embodiment, the disclosed method for performing a drilling operation on a manufactured article may include the steps of: (1) manipulating a drilling end effector adjacent to a work surface of the manufactured article, wherein the drilling end effector includes a motor operative to drive a drilling member, a housing surrounding the motor, and a vacuum shroud coupled to the housing and surrounding the drilling member, wherein the vacuum shroud has a variable length, (2) extending the drilling member into drilling engagement with the work surface, (3) contacting the vacuum shroud to the work surface around a drilling location and the drilling member, (4) collecting debris created by the drilling member within an interior of the vacuum shroud, (5) generating a vacuum within the vacuum shroud, (6) removing the debris from within the vacuum shroud, and (7) telescopically collapsing the vacuum shroud in response to the drilling member passing through the work surface.

Other embodiments of the disclosed systems and method will become apparent from the following detailed description, the accompanying drawings and the appended claims.

DETAILED DESCRIPTION

Figure 1:
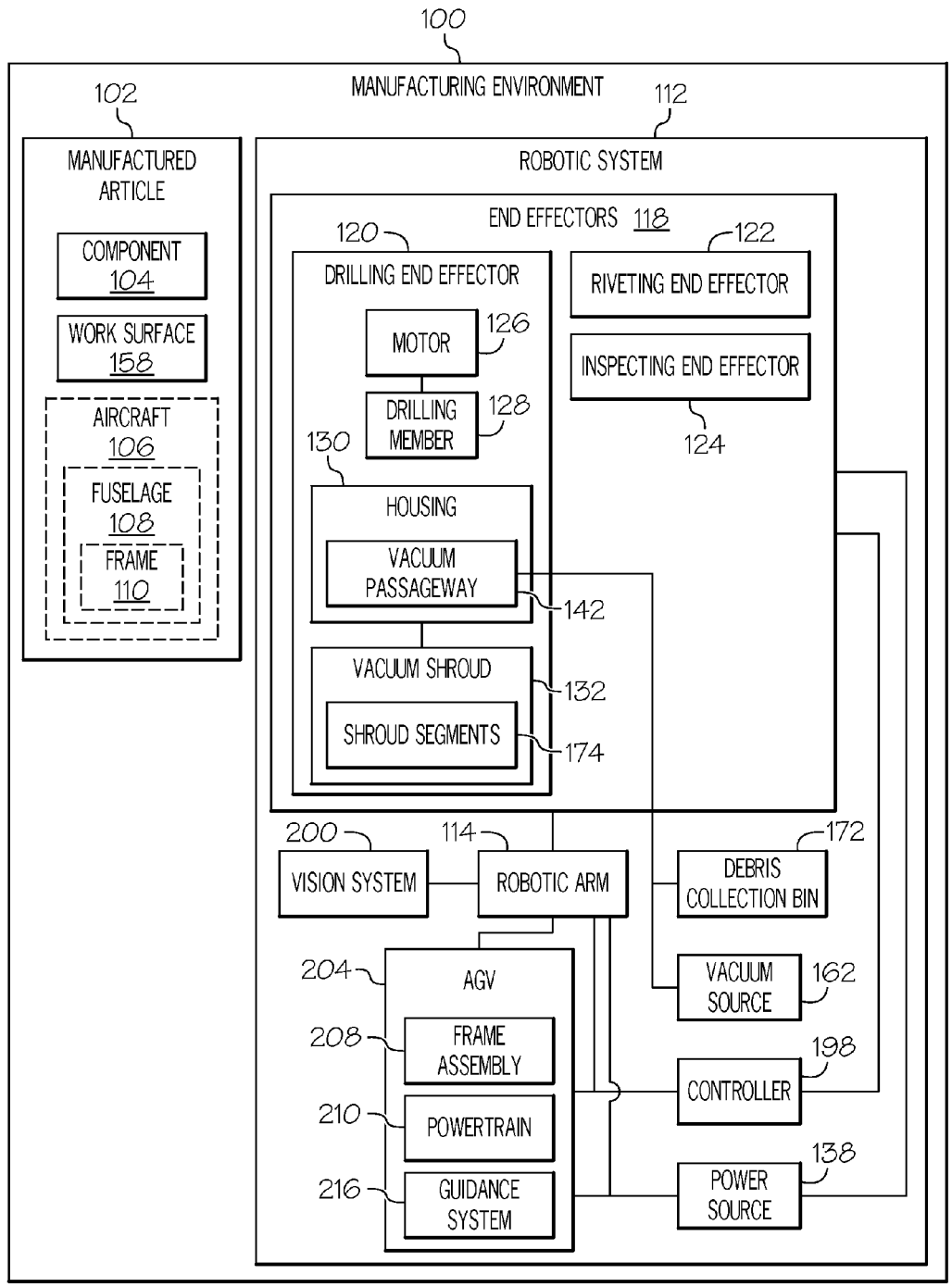
FIG. 1 is a schematic block diagram of one embodiment of a manufacturing environment.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Figure 13:
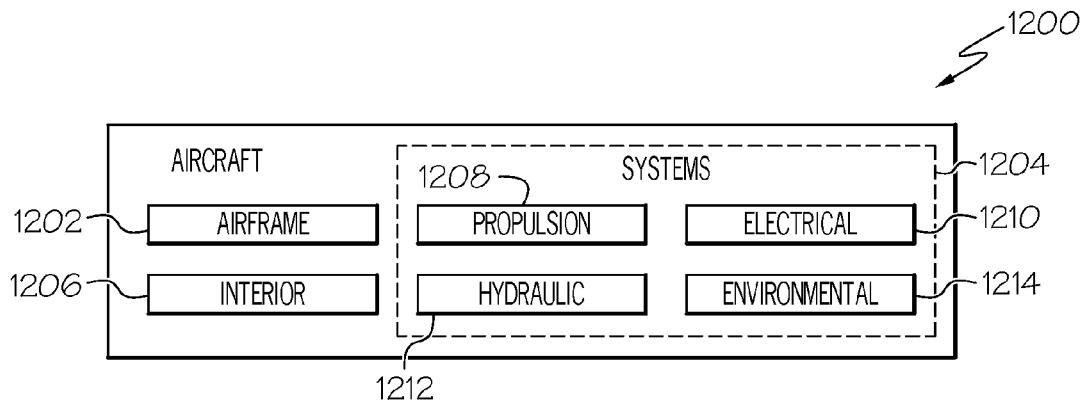
FIG. 13 is a schematic illustration of an aircraft.

In FIGS. 1 and 13, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1 and 13 may be combined in various ways without the need to include other features described in FIGS. 1 and 13, other drawing figures, and/or the accompanying disclosure, even though such combination or combinations are not explicitly illustrated herein. Similarly, additional features not limited to the examples presented, may be combined with some or all of the features shown and described herein.

Figure 11:
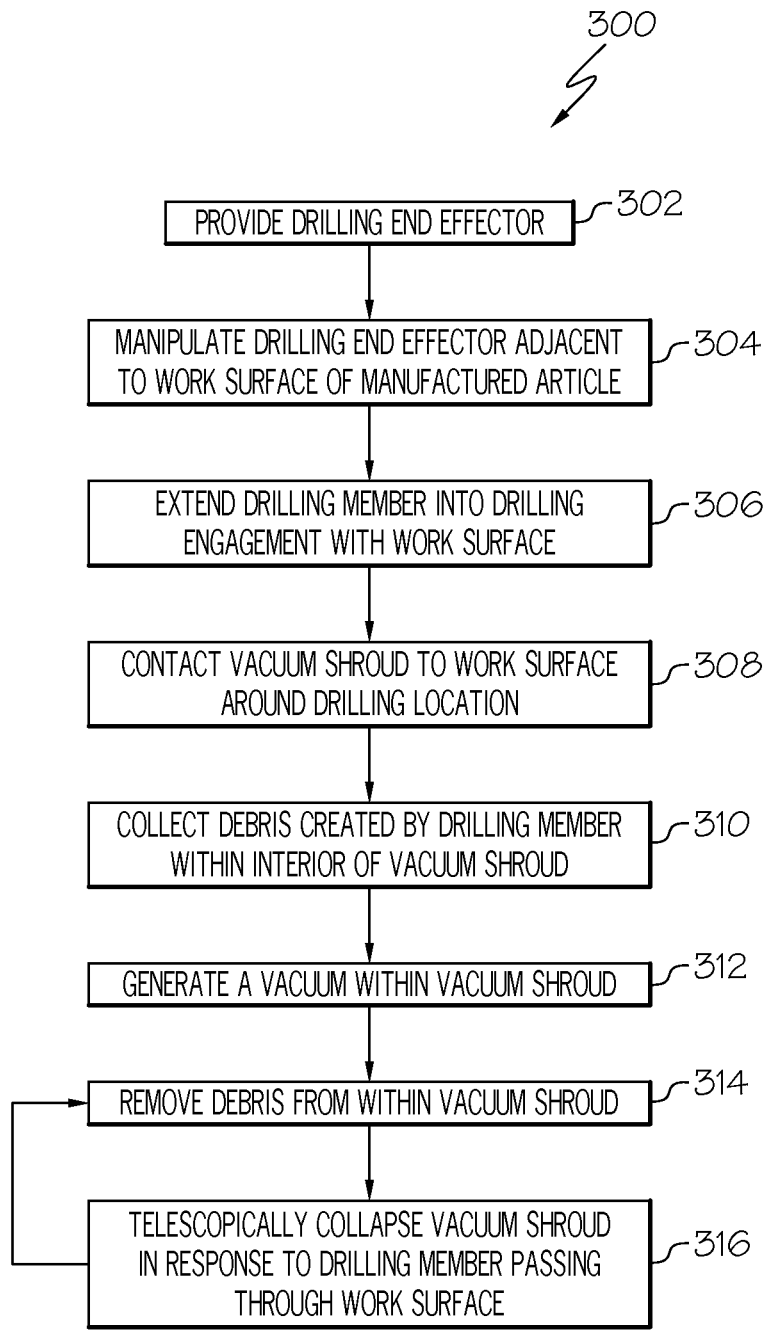
FIG. 11 is a flow diagram of one embodiment of a method for performing a drilling operation on a manufactured article.
Figure 12:
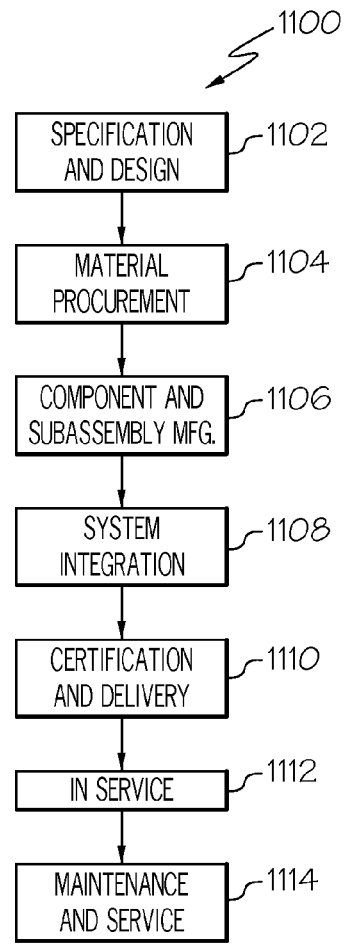
FIG. 12 is a block diagram of aircraft production and service methodology.

In FIGS. 11 and 12, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 11 and 12 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Reference herein to "example" means that one or more feature, structure, or characteristic described in connection with the example is included in at least one embodiment or implementation. The phrase "one example" or "another example" in various places in the specification may or may not be referring to the same example.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

Referring generally to FIG. 1, one embodiment of manufacturing environment, generally designated 100, is disclosed. Manufacturing environment 100 may be any suitable workspace or facility where one or more manufacturing operations are performed on manufactured article 102. Manufactured article 102 may include any workpiece on which the manufacturing operation will be performed. Manufactured article 102 may include one or more components 104. Component 104 may include any structure, surface or portion of manufactured article 102. The manufacturing operation may include any operation or process performed during fabrication, assembly, finishing and/or inspection of manufactured article 102 or component 104 of manufactured article 102.

Figure 2:
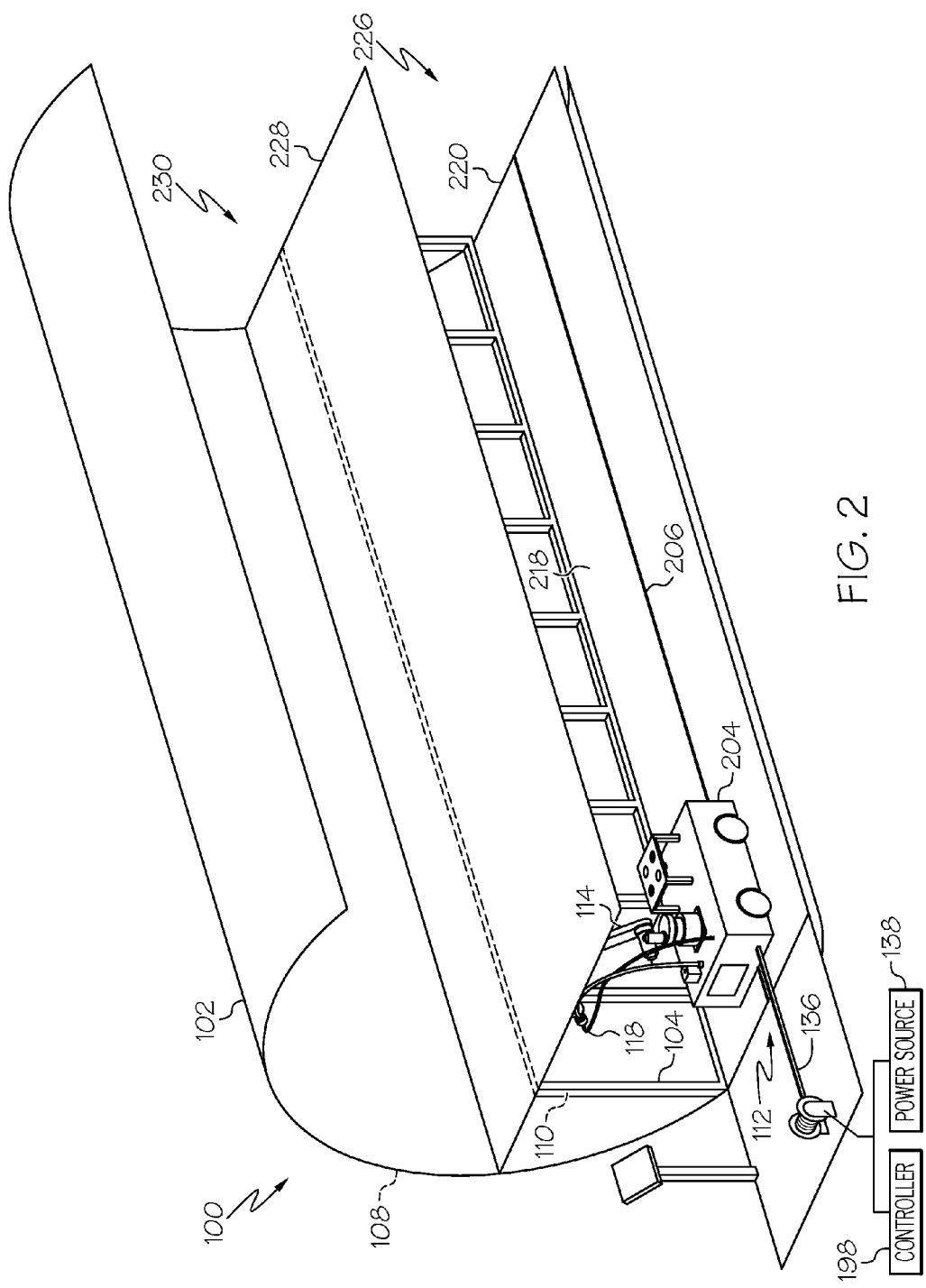
FIG. 2 is schematic perspective view of one embodiment of the manufacturing environment of FIG. 1.

Referring to FIG. 2, and with reference to FIG. 1, as one non-limiting example, manufactured article 102 is aircraft 106 (FIG. 1) and component 104 is fuselage 108 of aircraft 106. As another, non-limiting example, manufactured article 102 is fuselage 108 and component 104 is a portion of fuselage 108, for example, frame 110 (e.g., an internal support frame) of fuselage 108.

Figure 3:
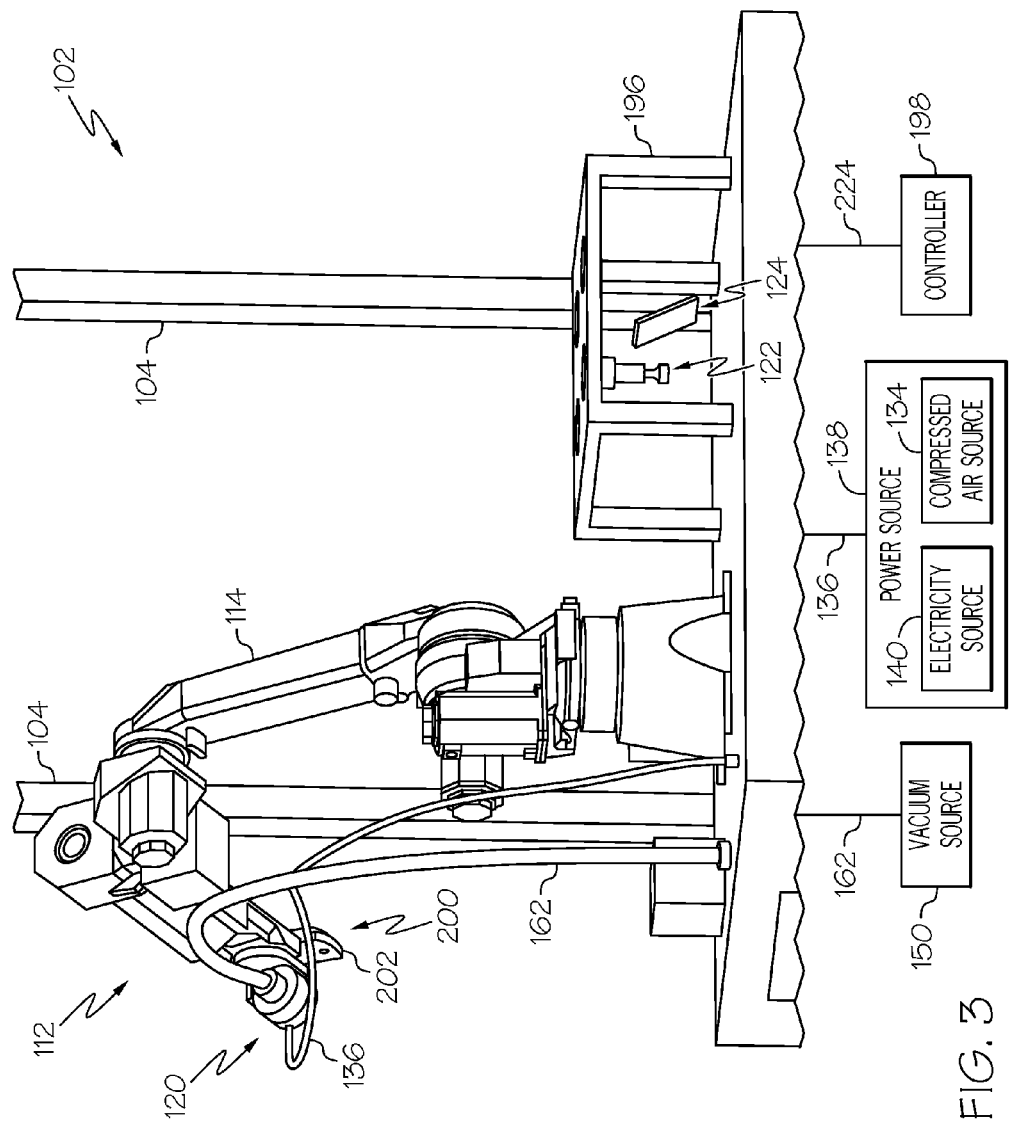
FIG. 3 is a schematic perspective view of one embodiment of a robotic system of FIG. 1.

Referring to FIG. 3, and with reference to FIGS. 1 and 2, one embodiment of robotic system, generally designated 112, is disclosed. Robotic system 112 operates within manufacturing environment 100 to perform various manufacturing operations on manufactured article 102. As one example, robotic system 112 includes robotic arm 114. One or more end effectors 118 (FIG. 1) may be coupled to robotic arm 114.

As one example, each one of end effectors 118 may be interchangeably coupled to an end of robotic arm 114. End effectors 118 may include any end of arm tooling or other device capable of performing one or more manufacturing operations. As non-limiting examples, end effectors 118 may include drilling end effector 120, riveting end effector 122, inspecting end effector 124 and the like.

Figure 4:
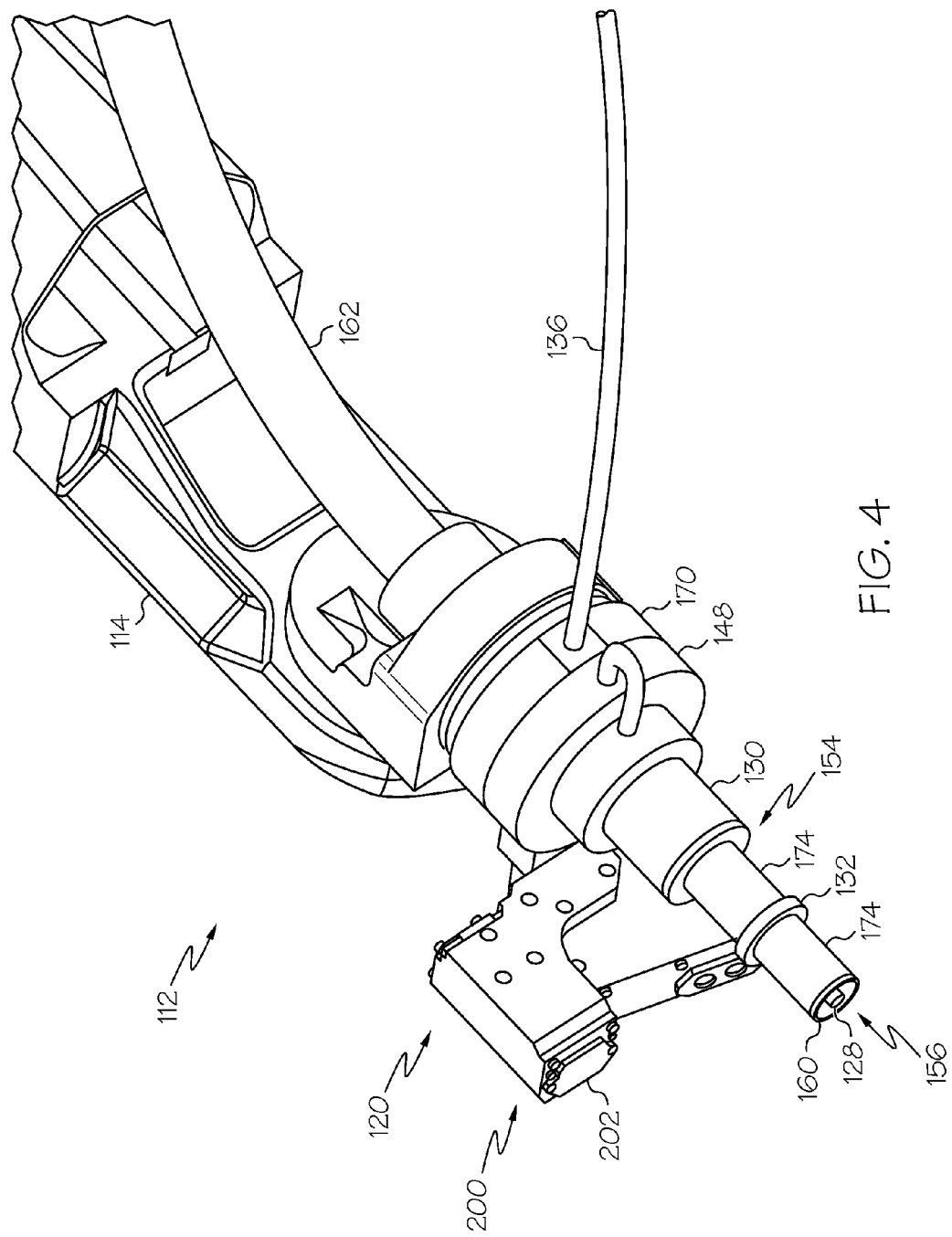
FIG. 4 is schematic perspective view of one embodiment of a drilling end effector of FIG. 1.
Figure 5:
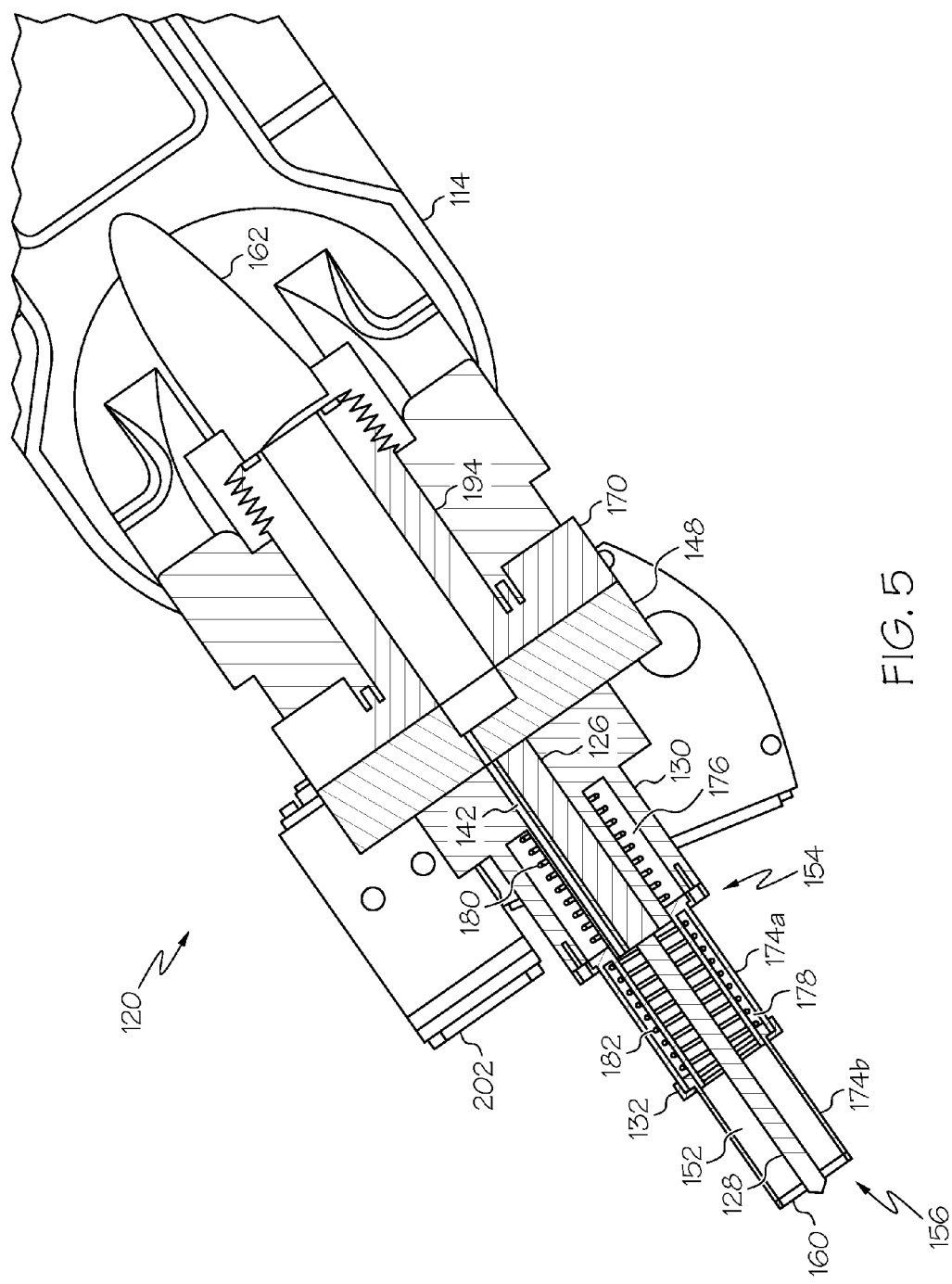
FIG. 5 is a schematic side elevation view, in section, of the drilling end effector of FIG. 4.
Figure 6:
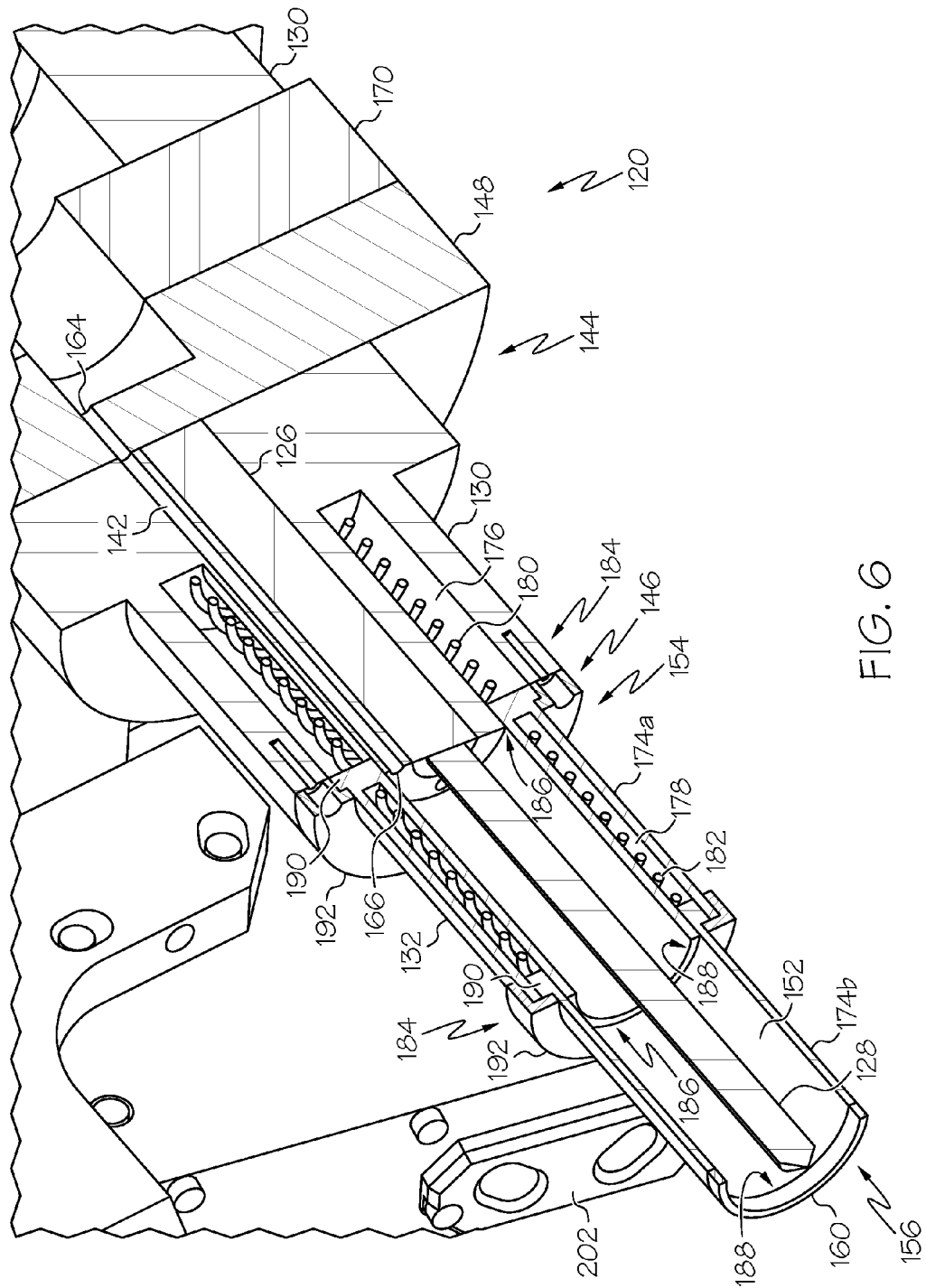
FIG. 6 is a schematic perspective view, in section, of the drilling end effector of FIG. 4.

Referring to FIGS. 4-6, and with reference to FIG. 1, as one example, drilling end effector 120 includes motor 126 (FIGS. 5 and 6) operative to drive drilling member 128 (FIGS. 5 and 6), housing 130 surrounding motor 126, and vacuum shroud 132 coupled to housing 130 and surrounding drilling member 128. Vacuum shroud 132 has a variable length.

Motor 126 (FIGS. 5 and 6) may be any suitable device capable of generating rotary motion to spin drilling member 128, for example, when performing a drilling operation on manufactured article 102 (FIG. 1). Robotic system 112 may include any suitable power source 138 (FIG. 3) coupled to motor 126 via supply line 136 (FIGS. 3 and 4) to provide power operable to drive motor 126.

As one example, motor 126 is a pneumatic motor (also known as an air drill) and power source 138 is compressed air source 134 (FIG. 3). In such an example, drilling end effector 120 is pneumatically coupled to compressed air source 134. Compressed air source 134 is configured to provide compressed air operable to drive motor 126. Accordingly, supply line 136 (FIGS. 3 and 4) is a compressed air supply line configured to fluidly couple compressed air source 134 to motor 126 of drilling end effector 120.

As one example, motor 126 is an electric motor (also known as an electric drill) and power source 138 is electricity source 140 (FIG. 3). In such an example, drilling end effector 120 is electrically coupled to electricity source 140. Electricity source 140 provides electricity operable to drive motor 126. Accordingly, supply line 136 (FIGS. 3 and 4) is an electrical supply line configured to electrically couple electricity source 140 to motor 126 of drilling end effector 120.

Other types of motors and associated power sources and supply lines are also contemplated without limitation.

Drilling member 128 (FIGS. 4-6) may be any cutting tool suitable for performing drilling, countersinking, counterboring, routing or other operations. As one example, drilling member 128 is a drill bit. Drilling member 128 is removably coupled to motor 126. Those skilled in the art will readily appreciate that motor 126 may include additional components configured to connect drilling member 128 to motor 126 and to transfer rotary motion from motor 126 to drilling member 128. While not explicitly illustrated, as one example, motor 126 includes a spindle (e.g., a shaft defining an axis of rotation for drilling member 128) operatively coupled to motor 126 and a coupling disposed at an end of the spindle. The coupling is configured to connect drilling member 128. As examples, the coupling may be a chuck, a collet or other clamping device.

Referring to FIGS. 4-6, housing 130 includes a body suitably sized and shaped to enclose and protect motor 126.

Housing 130 includes first end 144 and second end 146 opposite first end 144 (FIG. 6). In the examples illustrated in FIGS. 4-6, housing 130 has a cylindrical shape (e.g., housing has a tubular body) conducive to a motor 126 having a cylindrical shape (e.g., an air drill). However, housing 130 may have any shape conducive to the particular type of motor 126 or particular application in which drilling end effector 120 will be used.

Figure 7:
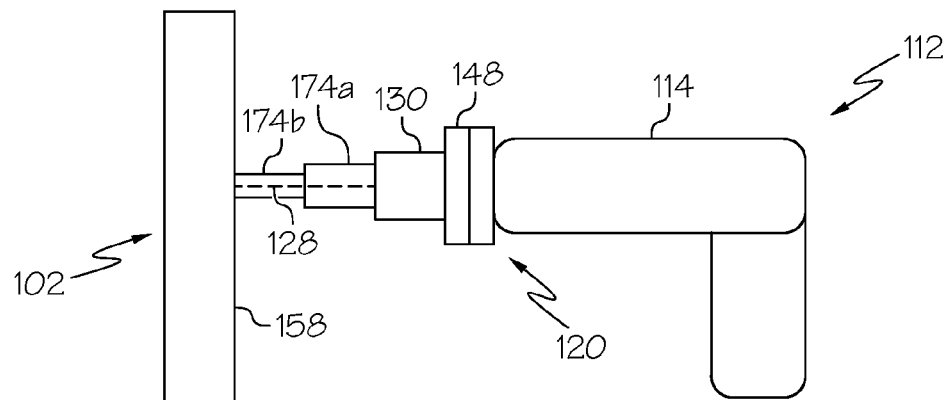
FIG. 7 is a schematic side elevation view of one embodiment of the robotic system of FIG. 1 illustrating a vacuum shroud of the drilling end effector in a full telescopically extended position.
Figure 8:
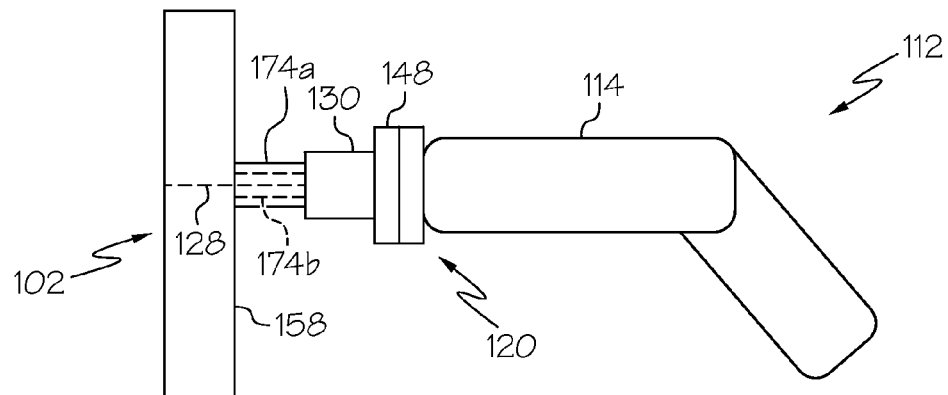
FIG. 8 is a schematic side elevation view of one embodiment the robotic system of FIG. 1, illustrating the vacuum shroud of the drilling end effector in a partial telescopically collapsed position.
Figure 9:
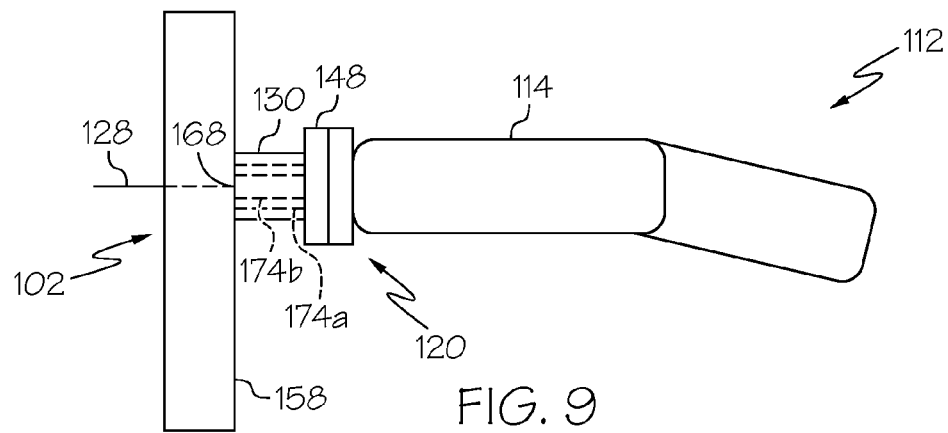
FIG. 9 is a schematic side elevation view of one embodiment the robotic system of FIG. 1, illustrating the vacuum shroud of the drilling end effector in a full telescopically collapsed position.

Referring to FIGS. 4-6, and with reference to FIGS. 7-9, as one example, vacuum shroud 132 extends from housing 130 approximately the length of drilling member 128. Vacuum shroud 132 is configured to surround drilling member 128 and drilling location 168 (FIGS. 7-9) on manufactured article 102 (FIG. 7-9) during a drilling operation. The length of vacuum shroud 132 varies corresponding to the depth of drilling member 128 through manufactured article 102 (e.g., drilling depth) during the drilling operation.

As illustrated in FIGS. 7-9, vacuum shroud 132 is collapsible during the drilling operation as drilling member 128 penetrates and/or passes through manufactured article 102 at drilling location 168. Vacuum shroud 132 is configured to collect debris (not explicitly illustrated) created by drilling member 128 proximate (e.g., at or near) drilling location 168 during the drilling operation. A vacuum is created within vacuum shroud 132 to remove any debris collected within vacuum shroud 132.

Depending upon the particular manufacturing environment 100 (e.g., aircraft manufacturing), the debris created during the drilling operation may be foreign object debris (also known as FOD) or debris that could potentially cause damage to manufactured article 102 if allowed to remain. The type and/or size of the foreign object debris created during the drilling operation may vary depend on, for example, the material composition of manufactured article 102 (FIG. 1), the type and/or size of drilling member 128 and the like.

Referring to FIGS. 4-6, and with reference to FIGS. 7-9, as one example, vacuum shroud 132 includes first end 154 and second end 156 opposite first end 154. First end 154 of vacuum shroud 132 is coupled to second end 146 (FIG. 6) of housing 130. Second end 156 of vacuum shroud 132 is initially positioned proximate (e.g., at or near) an end of drilling member 128 opposite motor 126. As one example, and as illustrated in FIGS. 7-9, vacuum shroud 132 is collapsible in response to second end 156 of vacuum shroud 132 being in contact with work surface 158 (e.g., drilled surface of manufactured article 102) and drilling member 128 being driven into and/or through drilled surface 158.

Referring to FIGS. 5 and 6, and with reference to FIG. 1, as one example, drilling end effector 120 includes vacuum passageway 142 extending through housing 130. Vacuum passageway 142 is in fluid communication with interior 152 (an area defined by interior 152) of vacuum shroud 132. A vacuum airflow (not explicitly illustrated) may be applied within interior 152 (the area defined by interior 152) of vacuum shroud 132, via vacuum passageway 142, during the drilling operation to remove any debris created during the drilling operation and collected within interior 152 of vacuum shroud 132.

Referring to FIGS. 3-6, and with reference to FIG. 1, as one example, drilling end effector 120 includes vacuum source 150 (FIG. 3). Vacuum source 150 is fluidly coupled to vacuum passageway 142. Vacuum source 150 is configured to generate the vacuum airflow within interior 152 (the area defined by interior 152) of vacuum shroud 132 suitable to remove any debris collected within vacuum shroud 132 through vacuum passageway 142.

As one example, and as illustrated in FIGS. 3-5, robotic system 112 includes vacuum supply line 162 configured to fluidly couple vacuum source 150 to vacuum passageway 142 of housing 130 of drilling end effector 120. As one example, vacuum supply line 162 may be coupled directly to drilling end effector 120 and in fluid communication with vacuum passageway 142.

Referring to FIG. 6, and with reference to FIGS. 1, 4 and 5, as one example, vacuum passageway 142 includes first vacuum port 164 and second vacuum port 166 opposite first vacuum port 164. Vacuum passageway 142 extends between first vacuum port 164 and second vacuum port 166. As one example, first vacuum port 164 is disposed at first end 144 of housing 130 and is accessible by vacuum supply line 162. Second vacuum port 166 is disposed at second end 146 of housing 130.

Second vacuum port 166 is disposed (e.g., located) within the interior 152 of vacuum shroud 132 such that the vacuum airflow generated by vacuum source 150 (FIG. 1) creates the vacuum within the area defined by interior 152 of vacuum shroud 132. As drilling member 128 creates debris during the drilling operation, any debris collected within vacuum shroud 132 is removed from interior 152 of vacuum shroud 132 through vacuum passageway 142. Accordingly, any debris created during the drilling operation is continuously vacuumed away during the drilling operation.

In one example implementation of the drilling operation, second end 156 of vacuum shroud 132 is placed (e.g., positioned by robotic arm 114) in contact with work surface 158 of manufactured article 102 and surrounds (e.g., encircles) drilling location 168, as illustrated in FIG. 7. As drilling member 128 creates debris during the drilling operation, the debris is collected at second end 156 of vacuum shroud 132. The vacuum airflow carries the debris through interior 152 of vacuum shroud 132 toward first end 154 of vacuum shroud 132. The debris enters second vacuum port 166, travels through vacuum passageway 142, exits first vacuum port 164 and is carried to debris collection bin 172 (FIG. 1) by vacuum supply line 162 (FIGS. 4 and 5).

As the drilling depth of drilling member 128 increases, the length of vacuum shroud 132 decreases by vacuum shroud 132 collapsing within housing 130, as illustrated in FIGS. 8 and 9. Any debris collected within vacuum shroud 132 is continually removed from within vacuum shroud 132 (as described above) as the length of vacuum shroud 132 decreases.

Referring to FIGS. 4-6, as one example, drilling end effector 120 includes seal 160 disposed at (e.g., coupled to) second end 156 of vacuum shroud 132. Seal 160 is configured to make contact with work surface 158 in order to tightly enclose drilling location 168 within second end 156 of vacuum shroud 132 and maintain the vacuum created within interior 152 (the area defined by interior 152) of vacuum shroud 132. As one non-limiting example, seal 160 may be a rubber ring coupled to a perimeter edge of second end 156 of vacuum shroud 132.

Referring to FIG. 4, and with reference to FIGS. 1 and 7-9, as one example, vacuum shroud 132 includes shroud segments 174 coupled to one another. Shroud segments 174 are collapsible between a telescopically extended position, as illustrated in FIG. 7, and a telescopically collapsed position, as illustrated in FIGS. 8 and 9. Shroud segments 174 of vacuum shroud 132 are biased to the telescopically extended position (FIGS. 4-7).

Referring to FIGS. 5 and 6, as one example, housing 130 includes housing receptacle 176. Vacuum shroud 132 includes first shroud segment 174a and second shroud segment 174*b*. First shroud segment 174*a* is telescopically collapsible within housing receptacle 176. First shroud segment 174*a* includes shroud segment receptacle 178. Second shroud segment 174*b* is telescopically collapsible within shroud segment receptacle 178.

As one example, housing 130 includes first spring 180 disposed within housing receptacle 176. First spring 180 biases first shroud segment 174*a* outwardly from housing 130. First shroud segment 174*a* includes second spring 182 disposed within shroud segment receptacle 178. Second spring 182 biases second shroud segment 174*b* outwardly from first shroud segment 174*a*. Accordingly, first spring 180 and second spring 182 bias vacuum shroud 132 in the telescopically extended position (FIGS. 4-7).

While the examples of vacuum shroud 132 illustrated in FIGS. 4-6 show two shroud segments 174 (e.g., first shroud segment 174*a* and second shroud segment 174*b*), different numbers of shroud segments 174 are contemplated. For example, vacuum shroud 132 may include one shroud segment 174 of three or more shroud segments 174. The total number of shroud segments 174 may depend on, for example, the length of drilling member 128, the length of each individual shroud segment 174, and/or the particular application in which drilling end effector 120 will be used.

In examples where vacuum shroud 132 includes more than two shroud segments 174, each shroud segment 174 is a telescopically collapsible member received within a receptacle of and biased outward from a preceding adjacent shroud segment 174. As one example, a lead shroud segment 174 is coupled to housing 130 and is received within housing receptacle 176 and biased outward from housing. An intermediate shroud segment 174 is coupled to the lead shroud segment 174 and is received with a receptacle of and biased outwardly from the lead shroud segment 174. Additional successive intermediate shroud segments 174 are each coupled to an immediately preceding adjacent intermediate shroud segment 174 and received with a receptacle of and biased outwardly from the immediately preceding adjacent intermediate shroud segment 174. A trailing shroud segment 174 is the last shroud segment 174 of vacuum shroud 132. The trailing shroud segment 174 is coupled to an immediately preceding adjacent intermediate shroud segment 174 and received with a receptacle of and biased outwardly from the immediately preceding adjacent intermediate shroud segment 174.

Thus, the lead shroud segment 174 is collapsible into housing, a first intermediate shroud segment 174 is collapsible into the lead shroud segment 174, additional intermediate shroud segments 174 are each collapsible into the next adjacent intermediate shroud segment 174, and the trailing shroud segment 174 is collapsible into the next adjacent intermediate shroud segment 174.

Referring to FIGS. 4-6, as one example, each shroud segment 174 (e.g., first shroud segment 174*a* and second shroud segment 174*b*) includes a tubular body. The tubular body of each shroud segment 174 may circumscribe drilling member 128. First shroud segment 174*a* has a diameter less than a diameter of housing 130. Second shroud segment 174*b* has a diameter less than the diameter of first shroud segment 174*a*. Housing receptacle 176 has a cylindrical shape suitably sized to receive the tubular body of first shroud segment 174*a*. Housing receptacle 176 may circumscribe motor 126. Shroud segment receptacle 178 has a cylindrical shape suitably sized to receive the tubular body of second shroud segment 174*b*. Shroud segment receptacle 178 may circumscribe drilling member 128. Similarly, first spring 180 has a cylindrical shape (e.g., a coil spring) suitable to fit within housing receptacle 176 and second spring 182 has a cylindrical shape (e.g., a coil spring) suitable to fit within shroud segment receptacle 178. First spring 180 may circumscribe motor 126 and second spring 182 may circumscribe drilling member 128.

While the examples of vacuum shroud 132 illustrated in FIGS. 4-6 show housing 130 and shroud segments 174 having tubular shapes and housing receptacle 176 and shroud segment receptacle 178 having cylindrical shapes, other practical shapes are also contemplated.

Referring to FIG. 6, as one example, first shroud segment 174*a* (e.g., the lead shroud segment 174) is coupled at one end to housing 130 (e.g., at second end 146). Each additional shroud segment 174 is also coupled to the next preceding shroud segment 174. As one example, second shroud segment 174*b* (e.g., the trailing shroud segment 174) is coupled to first shroud segment 174*a*. Coupling mechanism 184 may be used to couple shroud segment 174 to housing 130 and to another shroud segment 174.

Various types of coupling mechanisms 184 may be used to couple shroud segment 174 to housing 130 and/or to another shroud segment 174. As one example, each shroud segment 174 (e.g., first shroud segment 174*a* and second shroud segment 174*b*) includes first end 186 and second end 188 opposed to first end 186. Coupling mechanism 184 is configured to maintain first end 186 of shroud segment 174 within its respective receptacle (e.g., housing receptacle 176 or shroud segment receptacle 178) and limit telescopic extension of shroud segment 174 from its respective receptacle, while allowing telescopic collapse of shroud segment 174 within its respective receptacle.

As one example, each shroud segment 174 may include a flange 190 protruding outwardly from first end 186. An annular collar 192 may engage flange 190 to prevent shroud segment 174 from completely exiting its respective receptacle (e.g., (e.g., housing receptacle 176 or shroud segment receptacle 178). As one example, and as illustrated in FIG. 6, first shroud segment 174*a* includes flange 190 at first end 186. Collar 192 is coupled to second end 146 of housing 130 circumscribing first shroud segment 174*a*. Collar 192 coupling first shroud segment 174*a* to housing 130 engages flange 190 of first shroud segment 174*a* when first shroud segment 174*a* is in a full telescopically extended position and retains first shroud segment 174*a* within housing receptacle 176. Collar 192 coupling first shroud segment 174*a* to housing 130 allows first shroud segment 174*a* to move into a telescopically collapsed position within housing receptacle 176 during the drilling operation.

Similarly, second shroud segment 174*b* includes flange 190 at first end 186. Collar 192 is coupled to second end 188 of first shroud segment 174*a* circumscribing second shroud segment 174*b*. Collar 192 coupling second shroud segment 174*b* to first shroud segment 174*a* engages flange 190 of second shroud segment 174*b* when second shroud segment 174*b* is in a full telescopically extended position and retains second shroud segment 174*b* within shroud segment receptacle 178. Collar 192 coupling second shroud segment 174*b* to first shroud segment 174*a* allows second shroud segment 174*b* to move into a telescopically collapsed position within shroud segment receptacle 178 during the drilling operation.

Each collar 192 may be coupled to housing 130 or first shroud segment 174*a* in a variety of ways. As one example, collar 192 may be threadably coupled to the tubular body of housing 130 or first shroud segment 174*a*, for example, the collar 192 coupling second shroud segment 174*b* to first shroud segment 174*a* illustrated in FIG. 6. As one example, collar 192 may be fastened to the tubular body of housing 130 or first shroud segment 174a, for example, the collar 192 coupling first shroud segment 174a to housing 130 illustrated in FIG. 6.

Referring to FIGS. 4-6, as one example, drilling end effector 120 includes platform 148. Motor 126 may be coupled to platform 148. Housing 130 may be coupled to platform 148. Platform 148 is coupled to wrist 170 of robotic arm 114. As one example, platform 148 may be a quick change mechanism configured to quickly interchange drilling end effector 120 with a different one of end effectors 118 (FIG. 1).

In such an example, vacuum passageway 142 also extends through platform 148. As illustrated in FIG. 5, vacuum supply line 162 is coupled to wrist 170 of robotic arm 114 and is in fluid communication with vacuum passageway 142. As one example, wrist 170 of robotic arm 114 includes vacuum conduit 194. Vacuum conduit 194 is in fluid communication with vacuum passageway 142 of drilling end effector 120. Vacuum supply line 162 is coupled to vacuum conduit 194.

Also, in such an example, power source 138 (e.g., compressed air source 134) is coupled to wrist 170 via supply line 136 (e.g., compressed air supply line). Platform 148 may interconnect power source 138 and motor 126. As one example, platform 148 serves as a bridge between the appropriate power supply, for example, delivered from power source 138 via supply line 136, deliver to wrist 170 and motor 126.

Referring to FIG. 3, and with reference to FIG. 1, as one example, robotic system 112 may be configured to automatically disconnect one of end effectors 118 (e.g., drilling end effector 120) and automatically connect another (e.g., different) one of end effectors 118 (e.g., riveting end effector 122, inspecting end effector 124, etc.) depending upon the particular manufacturing operation being performed on manufactured article 102. While explicitly illustrated, as one example, each of end effectors 118 may include the quick disconnect mechanism (e.g., platform 148).

As one example, robotic system 112 includes tool stand 196. Tool stand 196 may be within reach of robotic arm 114. Tool stand 196 may be suitably configured to hold and store different end effectors 118 (FIG. 1) during periods of non-use. In one example implementation, upon completion of a particular manufacturing operation (e.g., a drilling operation) robotic arm 114 may position one of end effectors 118 (e.g., drilling end effector 120) within tool stand 196 and automatically disconnect the one of end effectors 118 from the end of robotic arm 114. The robotic arm 114 may then automatically connect another one of end effectors 118 (e.g., riveting end effector 122 or inspecting end effector 124) to the end of robotic arm 114 and remove the another one of end effectors 118 from tool stand 196 in order to perform a different manufacturing operation (e.g., a fastening operation or a visual inspecting operation).

As one example, riveting end effector 122 may be any suitably mechanism capable to installing a fastener (not explicitly shown) to manufactured article 102. The riveting end effector 122 may be coupled to power source 138. As one non-limiting example, riveting end effector 122 is a pneumatic riveter configured to install a rivet (not explicitly illustrated), for example, within a hole drilled into manufactured article 102 by drilling member 128. As one example (not explicitly shown), riveting end effector 122 (e.g., pneumatic riveter) includes a main body having an internal piston chamber, a piston movable within the piston chamber and a rivet set disposed at the end of the main body. Riveting end effector 122 is fluidly coupled to compressed air source 134.

Application of compressed air within the piston chamber drives the piston to impact the rivet set, which installs the rivet.

As one example, inspecting end effector 124 may be any suitable mechanism capable of non-destructive testing of manufacturing article 102. Inspecting end effector 124 may be coupled to power source 138. As one non-limiting example, inspecting end effector 124 is a non-destructive X-ray generator or scanner configured for remote visual inspection, for example, of the hole drilled into manufactured article 102 or the fastener (e.g., the rivet) installed to manufactured article 102. Inspecting end effector 124 (e.g., X-ray scanner) is electrically coupled to electricity source 140.

Referring to FIG. 3, and with reference to FIG. 1, as one example, robotic system 112 includes controller 198. Controller 198 may include any combination of electronic processing devices, memory devices, communication devices, input/output ("I/O") devices, and/or other known components and may perform various processing and/or communication related functions. As one example, controller 198 includes one or more microcontrollers, microprocessors, central processing units ("CPUs"), application specific integrated circuits ("ASICs") or any other suitable processing device known in the art.

As one example, controller 198 (e.g., via a processing device) processes information from a number of different sources, for example, to direct movement of robotic arm 114 and/or the position of end effector 118 during the manufacturing operation. As one example, controller 198 may be preprogrammed with instructions configured to direct robotic arm 114 and position end effector 118 at an appropriate location to perform the particular manufacturing operation. As another example, robotic system 112 includes vision system 200. Vision system 200 (FIG. 3) may include any suitable machine vision system configured to provide imaging-based automatic analysis for guidance of robotic arm 114. As one example, vision system 200 includes camera 202 (FIG. 4) coupled to robotic arm 114, for example, proximate end effector 118 and other appropriate processing hardware and software. Vision system 200 may send information to controller 198 to direct robotic arm 114 and position end effector 118 at an appropriate location to perform the particular manufacturing operation.

Figure 10:
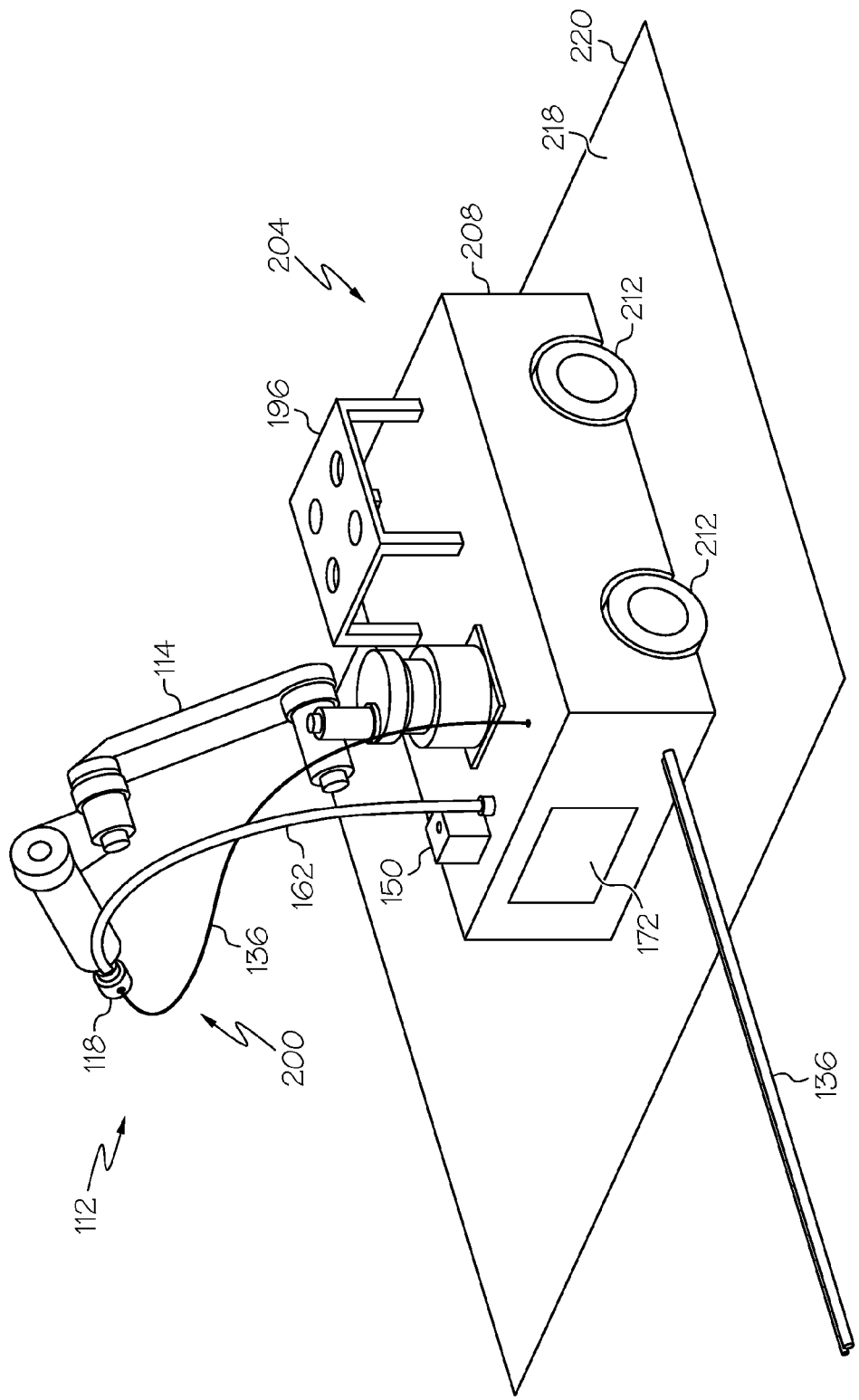
FIG. 10 is a schematic perspective view of one embodiment of the robotic system of FIG. 1.

Referring to FIG. 10, and with reference to FIGS. 1 and 3, as one example, robotic system 112 may be a mobile robotic system. As one example, robotic system 112 includes automated guided vehicle ("AGV") 204. Robotic arm 114 is coupled to and carried by AGV 204. AGV 204 may have any size, shape, style, type, or configuration of a vehicle that is capable of driving along a predetermined travel path 206 or route (FIG. 2) without a human operator. AGV 204 may be capable of supporting robotic arm 114, tool stand 196 and one or more additional end effectors 118. AGV 204 may vary from a small automatic cart up to a large vehicle.

As one example, AGV 204 generally includes frame assembly (e.g., a body) 208 and powertrain 210 (e.g., an engine or motor and a drivetrain) (FIG. 1) to which wheels 212 are attached. As one example, AGV 204 includes guidance system 216 (FIG. 1) having the ability through any known technique to provide steering and directional control to or through wheels 212.

AGV 204 may include at least three wheels 212 (four wheels 212 are illustrated by example). As one example, at least one wheel 212 is a directional wheel for receiving steering input from a controller (e.g., controller 198) to provide directional control of AGV 204. As one example, two or more wheels 212 are omnidirectional wheels (also referred to as omni wheels or poly wheels) to provide directional control. The particular configuration of wheels 212 may vary depending upon, for example, the type of AGV 204, the type of support surface 218 and/or floor 220 (FIG. 2) upon which AGV 204 travels and/or operates and the like.

As one example, travel path 206 of AGV 204 is routed through manufacturing environment 100 (FIG. 2). For example, travel path 206 may be routed around equipment or machinery, proximate manufactured article 102 on which a manufacturing operation is to be performed, through manufactured article 102 (e.g., fuselage 108) on which a manufacturing operation is to be performed and the like. Thus, the operating environment (e.g., manufacturing environment 100) of robotic system 112 is any environment in which AGV 204 navigates along travel path 206 to position robotic arm 114 at an appropriate location for end effector 118 to perform the manufacturing operation.

As one example (not explicitly illustrated), travel path 206 may include (or be defined by) a magnetic marker producing a magnetic field and extending along a predetermined route within manufacturing environment 100. As one example (not explicitly illustrated), travel path 206 may include (or be defined by) an electrified wire proving the magnetic field. As another example (not explicitly illustrated), travel path 206 may include (or be defined by) a wire providing a radio frequency ("RF") signal. As one example (not explicitly illustrated), travel path 206 may include (or be defined by) a guide rail.

As example, travel path 206 may be coupled to support surface 218, set into floor 220 (e.g., proximate or just below support surface 218). Guidance system 216 may be configured to automatically navigate along travel path 206. As one example, guidance system 216 of AGV 204 may include any combination of hardware and/or software that provides sensor readings pertaining to the type of travel path 206.

As one example, and as best illustrated in FIG. 10, vacuum source 150 and debris collection bin 172 are coupled to AGV 204. As one example (not explicitly illustrated), vacuum source 150 (e.g., a vacuum motor) is fluidly coupled to debris collection bin 172. Vacuum supply line 162 is fluidly coupled to debris collection bin 172. Any debris collected within vacuum shroud 132 (FIG. 4) is carried through vacuum supply line 162 to debris collection bin 172. Debris collection bin 172 is removable from AGV 204, for example, to dispose of the collected debris.

Referring to FIG. 2, and with reference to FIGS. 1 and 3, as one example, robotic system 112 includes tether assembly 222. As one example, tether assembly 222 couples robotic arm 114, end effectors 118 (e.g., drilling end effector 120, riveting end effector 122, inspecting end effector 124) and/or AGV 204 to power source 138 and/or controller 198. As one example, tether assembly 222 includes an extension of supply line 136 (e.g., a compressed air supply line, an electrical supply line). The extension of supply line 136 may be wound around a retractable (e.g., spring loaded) spool (illustrated but not explicitly identified in FIG. 2). In addition to supply line 136, tether assembly 222 may include control line 224. Control line 224 couples controller 198 to robotic system 112 (e.g., robotic arm 114, end effector 118 and/or AGV 204).

While the examples of robotic system 112 illustrated in FIGS. 1-3 show a single controller (e.g., controller 198) operable to provide instructions to and control operation of robotic arm 114, end effectors 118 and AGV 204, additional controllers or other configurations of controller may also be used. As one example, each component of robotic system 112 (e.g., robotic arm 114, end effector 118 and/or AGV 204) may have an individual controller.

Similarly, while the examples of robotic system 112 illustrated in FIGS. 1 and 2 show a single power source (e.g., power source 138) operable to deliver power to operate robotic arm 114, end effectors 118 and AGV 204, additional power sources or other power sources may also be used. As one example, each component of robotic system 112 may have an independent power source. As one example, drilling end effector 120 may utilize compressed air source 134 and robotic arm 114 and AGV 204 may utilize electricity source 140.

Accordingly, robotic system 112 may be particularly beneficial when performing manufacturing operations on manufactured article 102 in areas where space is limited or access is limited, for example, when assembling support frame 110 within an interior of lower lobe 226 of fuselage 108. As one example, and as illustrated in FIG. 2, during manufacture of fuselage 108, passenger compartment floor 228 may divide fuselage 108 into upper lobe 230 and lower lobe 226. Space and access to support frame 110 may be limited due to the enclosed nature of fuselage 108 and passenger compartment floor 228.

In FIG. 2, a portion of fuselage 108 is shown broken away in order to more clearly illustrate robotic system 112.

Further, adequate removal of debris (e.g., FOD) from within areas where space is limited or access (e.g., lower lobe 226 of fuselage 108) may be difficult and cumbersome. Accordingly, robotic system 112 including drilling end effector 120 may be particularly beneficial to continuously capture and remove the debris created by drilling member 128 during the drilling operation.

Referring to FIG. 11, and with reference to FIGS. 1-10, one embodiment of method, generally designated 300, for performing a drilling operation on manufactured article 102 is disclosed. Modifications, additions, or omissions may be made to method 300 without departing from the scope of the present disclosure. Method 300 may include more, fewer, or other steps. Additionally, steps may be performed in any suitable order.

Referring to FIG. 11, and with reference to FIGS. 1-6, in one example implementation, method 300 includes the step of providing drilling end effector 120, as shown at block 302. Drilling end effector 120 including motor 126 operative to drive drilling member 128, housing 130 surrounding motor 126, and vacuum shroud 132 coupled to housing 130 and surrounding drilling member 128. Vacuum shroud 132 has a variable length.

Referring to FIG. 11, and with reference to FIGS. 1-7, in one example implementation, method 300 includes the step of manipulating drilling end effector 120 adjacent to work surface 158 of manufactured article 102, as shown at block 304. As one example, the step of manipulating drilling end effector 120 is accomplished using robotic arm 114. AGV 204 transports robotic arm 114 adjacent to manufactured article 102, for example, by automatically navigating along predetermined travel path 206.

Referring to FIG. 11, and with reference to FIGS. 1-7, in one example implementation, method 300 includes the step of extending drilling member 128 into drilling engagement with work surface 158, as shown at block 306. As one example, the step of extending drilling member 128 is accomplished using robotic arm 114.

Referring to FIG. 11, and with reference to FIGS. 1-7, in one example implementation, method 300 includes the step of contacting vacuum shroud 132 to work surface 158 around drilling location 168, as shown at block 308. As one example, the step of contacting vacuum shroud 132 to work surface 158 is accomplished using robotic arm 114 when drilling member 128 is extended into drilling engagement with work surface 158.

Referring to FIG. 11, and with reference to FIGS. 1-7, in one example implementation, method 300 includes the step of collecting debris created by drilling member 128 within interior 152 of vacuum shroud 132, as shown at block 310.

Referring to FIG. 11, and with reference to FIGS. 1-7, in one example implementation, method 300 includes the step of generating a vacuum within vacuum shroud 132, as shown at block 312. As one example, the step of generating the vacuum within the area defined by interior 152 of vacuum shroud 132 is achieved by applying a vacuum airflow from vacuum source 150, through vacuum passageway 142, and into interior 152 of vacuum shroud 132.

Referring to FIG. 11, and with reference to FIGS. 1-7, in one example implementation, method 300 includes the step of removing the debris from within vacuum shroud 132, as shown at block 314. Any removed debris may be collected within debris collection bin 172.

Referring to FIG. 11, and with reference to FIGS. 1-9, in one example implementation, method 300 includes the step of telescopically collapsing vacuum shroud 132 in response to drilling member 128 passing through work surface 158, as shown at block 316. As one example, the step of telescopically collapsing vacuum shroud 132 is achieved by telescopically collapsing second shroud segment 174b into first shroud segment 174a and telescopically collapsing first shroud segment 174a into housing 130.

Examples of the present disclosure may be described in the context of aircraft manufacturing and service method 1100 as shown in FIG. 12 and aircraft 1200 as shown in FIG. 13. Aircraft 1200 may be one example of aircraft 106 illustrated in FIG. 1.

During pre-production, the illustrative method 1100 may include specification and design, as shown at block 1102, of aircraft 1200 and material procurement, as shown at block 1104. During production, component and subassembly manufacturing, as shown at block 1106, and system integration, as shown at block 1108, of aircraft 1200 may take place. Thereafter, aircraft 1200 may go through certification and delivery, as shown block 1110, to be placed in service, as shown at block 1112. While in service, aircraft 1200 may be scheduled for routine maintenance and service, as shown at block 1114. Routine maintenance and service may include modification, reconfiguration, refurbishment, etc. of one or more systems of aircraft 1200.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 13, aircraft 1200 produced by illustrative method 1100 may include airframe 1202 with a plurality of high-level systems 1204 and interior 1206. Examples of high-level systems 1204 include one or more of propulsion system 1208, electrical system 1210, hydraulic system 1212 and environmental system 1214. Any number of other systems may be included. Although an aerospace example is shown, the principles disclosed herein may be applied to other industries, such as the automotive industry, the marine industry, the construction industry or the like.

The systems, apparatus and methods shown or described herein may be employed during any one or more of the stages of the manufacturing and service method 1100. For example, components or subassemblies corresponding to component and subassembly manufacturing (block 1106) may be fabricated or manufactured in a manner similar to components or subassemblies produced while aircraft 1200 is in service (block 1112). Also, one or more examples of the apparatus, systems and methods, or combination thereof may be utilized during production stages (blocks 1108 and 1110), for example, by removing FOD created during a drilling operation concurrently with performance of the drilling operation. Similarly, one or more examples of the apparatus and methods, or a combination thereof, may be utilized, for example and without limitation, while aircraft 1200 is in service (block 1112) and during maintenance and service stage (block 1114).

Although various embodiments of the disclosed systems, apparatuses and methods have been shown and described, modifications may occur to those skilled in the art upon reading the specification. The present application includes such modifications and is limited only by the scope of the claims.

What is claimed is:

1. A drilling end effector comprising:
   a motor operative to drive a drilling member;
   a housing surrounding said motor;
   a vacuum shroud coupled to said housing and surrounding said drilling member, wherein said vacuum shroud has a variable length; and
   a platform removably coupling the drilling end effector to a robotic arm, the platform including a vacuum passageway removably coupling to a vacuum conduit of the robotic arm, wherein the vacuum passageway is in fluid communication with an area defined by an interior of said vacuum shroud.

2. The end effector of claim 1 wherein said vacuum passageway extends through said housing.

3. The end effector of claim 2 wherein:
   said motor is coupled to said platform,
   said housing is coupled to said platform, and
   said vacuum passageway extends through said platform.

4. The end effector of claim 1 wherein:
   said vacuum shroud comprises a first end coupled to said housing and a second end opposite said first end,
   said second end of said vacuum shroud is initially positioned proximate an end of said drilling member, and
   said vacuum shroud is collapsible in response to said second end of said vacuum shroud being in contact with a drilled surface and said drilling member being driven through said drilled surface.

5. The end effector of claim 4 further comprising a seal coupled to said second end of said vacuum shroud.

6. The end effector of claim 1 wherein said vacuum shroud comprises shroud segments coupled to one another, and wherein said shroud segments are collapsible between a telescopically extended position and a telescopically collapsed position.

7. The end effector of claim 6 wherein said shroud segments are biased to said telescopically extended position.

8. The end effector of claim 1 wherein:
   said housing comprises a housing receptacle, and
   said vacuum shroud comprises:

a first shroud segment telescopically collapsible within said housing receptacle, wherein said first shroud segment comprises a shroud receptacle; and a second shroud segment telescopically collapsible within said shroud receptacle.

9. The end effector of claim 8 wherein:

said housing further comprises a first spring disposed within said housing receptacle, said first spring biases said first shroud segment outwardly from said housing, said first shroud segment further comprises a second spring disposed within said shroud receptacle, and said second spring biases said second shroud segment outwardly from said first shroud segment.

10. A robotic system comprising:

a robotic arm having a vacuum conduit; and a drilling end effector removably coupled to said robotic arm, wherein said drilling end effector comprises:

a motor operative to drive a drilling member;

a housing surrounding said motor;

a vacuum shroud coupled to said housing and surrounding said drilling member, wherein said vacuum shroud has a variable length; and a vacuum passageway removably coupled to said vacuum conduit of the robotic arm, wherein the vacuum passageway is in fluid communication with an area defined by an interior of said vacuum shroud.

11. The system of claim 10 further comprising an automated guided vehicle configured to travel along a predetermined travel path, wherein said robotic arm is coupled to said automated guided vehicle.

12. The system of claim 10 wherein said vacuum passageway extends through said housing.

13. The system of claim 12 further comprising a vacuum source fluidly coupled to said vacuum passageway, wherein said vacuum source is configured to generate a vacuum airflow within said interior of said vacuum shroud.

14. The system of claim 10 wherein:

said vacuum shroud comprises a first end coupled to said housing and a second end opposite said first end, said second end of said vacuum shroud is initially positioned proximate an end of said drilling member, and said vacuum shroud is collapsible in response to said second end of said vacuum shroud being in contact with a drilled surface and said drilling member being driven through said drilled surface.

15. The system of claim 14 wherein said drilling end effector further comprises a seal coupled to said second end of said vacuum shroud.

16. The system of claim 10 wherein:

said vacuum shroud comprises shroud segments coupled to one another, said shroud segments are collapsible between a telescopically extended position and a telescopically collapsed position, and said shroud segments are biased to said telescopically extended position.

17. The system of claim 10 wherein:

said housing comprises a housing receptacle, and said vacuum shroud comprises:

a first shroud segment telescopically collapsible within said housing receptacle, wherein said first shroud segment comprises a shroud receptacle;

a second shroud segment telescopically collapsible within said shroud receptacle; and a seal coupled to an end of said second shroud segment opposite said first shroud segment.

18. The system of claim 17 wherein:

said housing further comprises a first spring disposed within said housing receptacle, said first spring biases said first shroud segment outwardly from said housing, said first shroud segment further comprises a second spring disposed within said shroud receptacle, and said second spring biases said second shroud segment outwardly from said first shroud segment.

19. The system of claim 10 wherein said robotic arm comprises a wrist, and wherein said vacuum conduit extends through said wrist.

20. A method for performing a drilling operation on a manufactured article, said method comprising:

coupling a drilling end effector to a robotic arm;

manipulating said drilling end effector adjacent to a work surface of said manufactured article, wherein said drilling end effector comprises:

a motor operative to drive a drilling member;

a housing surrounding said motor;

a vacuum shroud coupled to said housing and surrounding said drilling member, wherein said vacuum shroud has a variable length; and a platform removably coupling the drilling end effector to a robotic arm, the platform including a vacuum passageway removably coupling to a vacuum conduit of the robotic arm, wherein the vacuum passageway is in fluid communication with an area defined by an interior of said vacuum shroud;

extending said drilling member into drilling engagement with said work surface;

contacting said vacuum shroud to said work surface around a drilling location and said drilling member;

collecting debris created by said drilling member within an interior of said vacuum shroud;

generating a vacuum within said vacuum shroud;

removing said debris from within said vacuum shroud;

telescopically collapsing said vacuum shroud in response to said drilling member passing through said work surface;

decoupling said drilling end effector from said robotic arm; and coupling another end effector to said robotic arm.

* * * * *